Patented Oct. 28, 1930

1,779,710

UNITED STATES PATENT OFFICE

GEORGE M. NORMAN, OF WILMINGTON, DELAWARE, ASSIGNOR TO HERCULES POWDER COMPANY, OF WILMINGTON, DELAWARE, A CORPORATION OF DELAWARE

DIETHYLENE GLYCOL ESTERS OF ABIETIC ACID AND METHOD OF PRODUCING THE SAME

No Drawing. Application filed August 10, 1927, Serial No. 212,148. Renewed March 25, 1930.

My invention relates to the diethylene glycol ester of abietic acid and method of producing the same.

Heretofore it has been known to produce glycerine esters of abietic acid and such have been known and used as gums in paints and varnishes, however, the diethylene glycol ester of abietic acid has not heretofore been known.

Now according to my invention, I have discovered the diethylene glycol ester of abietic acid and a method for its preparation and that it serves admirably for use as a gum in lacquers, varnishes and the like.

The diethylene glycol ester of abietic acid may be prepared by refluxing rosin with diethylene glycol in the presence of a catalyst to effect a reaction between the abietic acid of the rosin and the glycol with the formation of the diethylene glycol ester. Abietic acid may be treated as found in natural rosin which is composed largely of abietic acid, or if desired natural rosin may be crystallized from, for example, alcohol or acetic acid to give abietic acid, and if desired the rosin may be refined, as by distillation, before crystallization.

As a specific example of the production of the diethylene glycol ester of abietic acid, 60 parts of diethylene glycol, boiling point about 245° C. and 300 parts of rosin of color grade H, acid number 162, and which may be a gum rosin or a purified wood rosin, are heated under atmospheric pressure to say 250° C. to 260° C., in the presence of 5 parts of a catalyst, which may be zinc dust, boric acid, or the like. The heating is continued for about five hours, a short air condenser being used during a part of the heating period to permit the escape of water. After about ten hours further heating, the reaction is substantially completed; the temperature of the mass is then raised to about 300° C. and the pressure reduced to about 15 mm. of mercury in order to distill off the low end of rosin and any excess of diethylene glycol, etc. which may be recovered by condensation. The residue, about 270 parts, will constitute the diethylene glycol ester, having an acid number of 22, grading E in color and having a melting point of about 60° C.

According to theory 604 parts of abietic acid react with 106 parts of diethylene glycol, e. g. two molecules of abietic acid per molecule of diethylene glycol. The reaction may be represented as follows:—

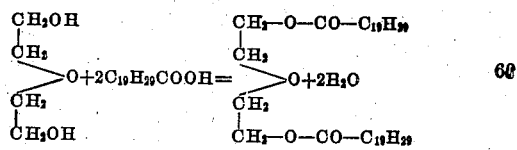

It will be understood that the use of a catalyst, as zinc dust, boric acid, or the like, is not essential to the production of the diethylenes glycol ester. The reaction may be effected through the application of heat alone, but the catalyst will facilitate the reaction and shorten the time required for its completion. If desired, the time required for completion of the reaction may be shortened by the use of a temperature above 250° C., but in order to permit of heating to much beyond 250° C. during the esterification, increase in pressure above atmospheric is necessary in order to prevent loss of diethylene glycol.

It will be understood that in the production of the diethylene glycol ester of abietic acid in accordance with my invention no special form of apparatus is required.

Having now fully described my invention, what I claim and desire to protect by Letters Patent is:

1. As a new composition of matter the diethylene glycol ester of abietic acid.

2. The method of producing the diethylene glycol ester of abietic acid, which includes heating diethylene glycol with abietic acid.

3. The method of producing the diethylene glycol ester of abietic acid, which includes heating diethylene glycol with rosin.

4. The method of producing the diethylene glycol ester of abietic acid, which includes heating diethylene glycol with rosin in the presence of a catalyst adapted to promote the esterification reaction between the rosin and the diethylene glycol.

5. The method of producing the diethylene glycol ester of abietic acid, which includes heating diethylene glycol with abietic acid to effect the esterification reaction between the diethylene glycol and the abietic acid and then distilling off any unchanged abietic acid and excess diethylene glycol.

6. The method of producing the diethylene glycol ester of abietic acid, which includes heating diethylene glycol with rosin in the presence of zinc dust to a temperature of about 250° C. to effect the esterification reaction between the diethylene glycol and the rosin, and raising the temperature to about 300° C. and reducing the pressure when the reaction is complete to distill off the low end of the rosin and excess diethylene glycol.

In testimony of which invention, I have hereunto set my hand, at Wilmington, Delaware, on this 2nd day of August, 1927.

GEORGE M. NORMAN.